(12) United States Patent
Chuang

(10) Patent No.: US 7,628,451 B2
(45) Date of Patent: Dec. 8, 2009

(54) BICYCLE SADDLE

(76) Inventor: Louis Chuang, 8<sup>th</sup> Floor-4, No. 20, Ta Lon Road, Taichung (TW)

( * ) Notice: Subject to any disclaimer, the term of this patent is extended or adjusted under 35 U.S.C. 154(b) by 262 days.

(21) Appl. No.: 11/556,514

(22) Filed: Nov. 3, 2006

(65) Prior Publication Data
US 2008/0179925 A1 Jul. 31, 2008

(30) Foreign Application Priority Data
Nov. 25, 2005 (TW) .............................. 94141595 A

(51) Int. Cl.
*B62J 1/00* (2006.01)
(52) U.S. Cl. .............. 297/201; 297/215.14; 297/215.15
(58) Field of Classification Search .................. 297/201, 297/215.13, 215.14
See application file for complete search history.

(56) References Cited

U.S. PATENT DOCUMENTS

| 629,956 | A | * | 8/1899 | Craig ...................... 297/201 X |
| 649,875 | A | | 3/1902 | Meighan ...................... 297/201 |
| 823,916 | A | | 6/1906 | Brooks et al. ................. 297/207 |
| 4,063,775 | A | | 12/1977 | Mesinger .................... 297/201 |
| 4,512,608 | A | | 4/1985 | Erani ......................... 297/201 |
| 4,877,286 | A | * | 10/1989 | Hobson et al. ......... 297/215.13 |
| 5,286,082 | A | | 2/1994 | Hanson ....................... 297/201 |
| 5,676,420 | A | | 10/1997 | Kuipers et al. ............... 297/204 |
| 5,823,618 | A | | 10/1998 | Fox ............................. 297/201 |
| 5,921,624 | A | | 7/1999 | Wu ........................ 297/215.14 |
| 6,106,059 | A | | 8/2000 | Minkow et al. ............. 297/202 |
| 6,176,546 | B1 | | 1/2001 | Andrews .................. 297/195.1 |
| 6,402,236 | B1 | | 6/2002 | Yates .......................... 297/201 |
| 6,450,572 | B1 | | 9/2002 | Kuipers .................... 297/195.1 |
| 6,666,507 | B1 | | 12/2003 | Ringgard .................. 297/195.1 |
| 6,752,453 | B1 | | 6/2004 | Yapp ...................... 297/215.14 |
| 6,886,887 | B2 | | 5/2005 | Yu ............................... 297/214 |
| 7,178,869 | B2 | * | 2/2007 | Ljubich ................... 297/201 X |
| 2002/0096917 | A1 | | 7/2002 | Turudich .................... 297/202 |
| 2004/0004375 | A1 | | 1/2004 | Garland et al. ............. 297/204 |
| 2004/0056519 | A1 | | 3/2004 | Kastarlak ................. 297/195.1 |
| 2007/0176472 | A1 | | 8/2007 | Chuang ...................... 297/202 |

OTHER PUBLICATIONS

Chinese Patent Publication No. CN2523668Y, Dec. 4, 2002, 15 pages.
European Patent Publication No. EP1394025 A1, Mar. 3, 2004, 14 pages.
Chinese Patent Publication No. CN 2262520 Y, Sep. 17, 1997, 6 pages.
Chinese Patent Publication No. CN 2499308Y, Jul. 10, 2002, 9 pages.
Chinese Patent Publication No. CN 1629030 A, Jun. 22, 2005, 13 pages.
German Utility Model Publication No. DE202006009040 U1, Nov. 2, 2006, 28 pages.

* cited by examiner

*Primary Examiner*—Anthony D Barfield
(74) *Attorney, Agent, or Firm*—Alan Kamrath; Kamrath & Associates PA

(57) ABSTRACT

A saddle for a bicycle includes a frame and a padding device. The frame includes a front tray and a rear tray. The rear tray defines at least one slot. The padding device includes a front pad and at least one rear pad. The front pad is installed on the front tray. The rear pad includes a block formed on the bottom thereof. The block is movable in the slot so that the rear pad is movable on the rear tray.

19 Claims, 11 Drawing Sheets

BICYCLE SADDLE

BACKGROUND OF INVENTION

1. Field of Invention

The present invention relates to a bicycle and, more particularly, to a saddle of a bicycle.

2. Related Prior Art

A conventional saddle includes a substantially triangular configuration tapering from a rear portion to a front portion through an intermediate portion. A conventional saddle includes a rigid body, a metal frame connected to the bottom of the rigid body and a soft pad provided on the top of the rigid body. With the metal frame, the saddle can be installed on the saddle post of a bicycle. The soft pad can cushion a rider's hips. There are different sizes of saddles for different sizes of bicycles. However, each bicycle is equipped with a saddle made with a fixed size. When a bicycle is shared by different riders, its saddle cannot fit their hips equally well. That is, some feel comfortable on the saddle, while others do not. This problem is particularly serious when the bicycle is used in a rental business. A rider with big hips deems the saddle too small. A rider with small hips deems the saddle too big. The front portion of the saddle presses a male rider's scrotum and depresses his blood circulation. The intermediate portion of the saddle rubs a rider's thighs and makes the rider feel uncomfortable.

The present invention is therefore intended to obviate or at least alleviate the problems encountered in the prior art.

SUMMARY OF INVENTION

According to the present invention, a saddle is disclosed for a bicycle. The saddle includes a frame and a padding device. The frame includes a front tray and a rear tray. The rear tray defines at least one slot. The padding device includes a front pad and at least one rear pad. The front pad is installed on the front tray. The rear pad includes a block formed on the bottom thereof. The block is movable in the slot so that the rear pad is movable on the rear tray.

The primary advantage of the saddle of the present invention is its adjustable size.

Other advantages and features of the present invention will become apparent from the following description referring to the drawings.

BRIEF DESCRIPTION OF DRAWINGS

The present invention will be described through detailed illustration of two embodiments referring to the drawings.

DETAILED DESCRIPTION OF EMBODIMENTS

Figure 1:
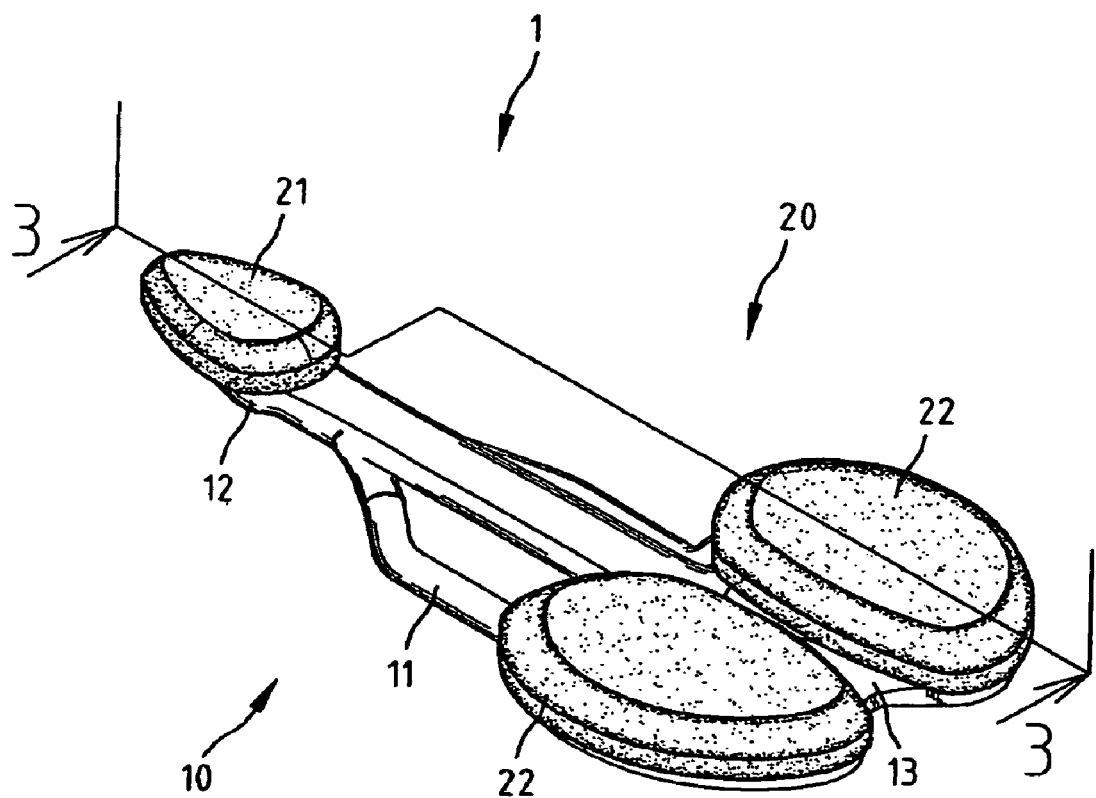
FIG. 1 is a perspective view of a saddle of a bicycle according to the first embodiment of the present invention.

Referring to FIG. 1, there is shown a saddle 1 for a bicycle according to a first embodiment of the present invention. The saddle 1 includes a frame 10 and a padding device 20. The size of the padding device 20 can be adjusted in order to fit different riders.

Figure 2:
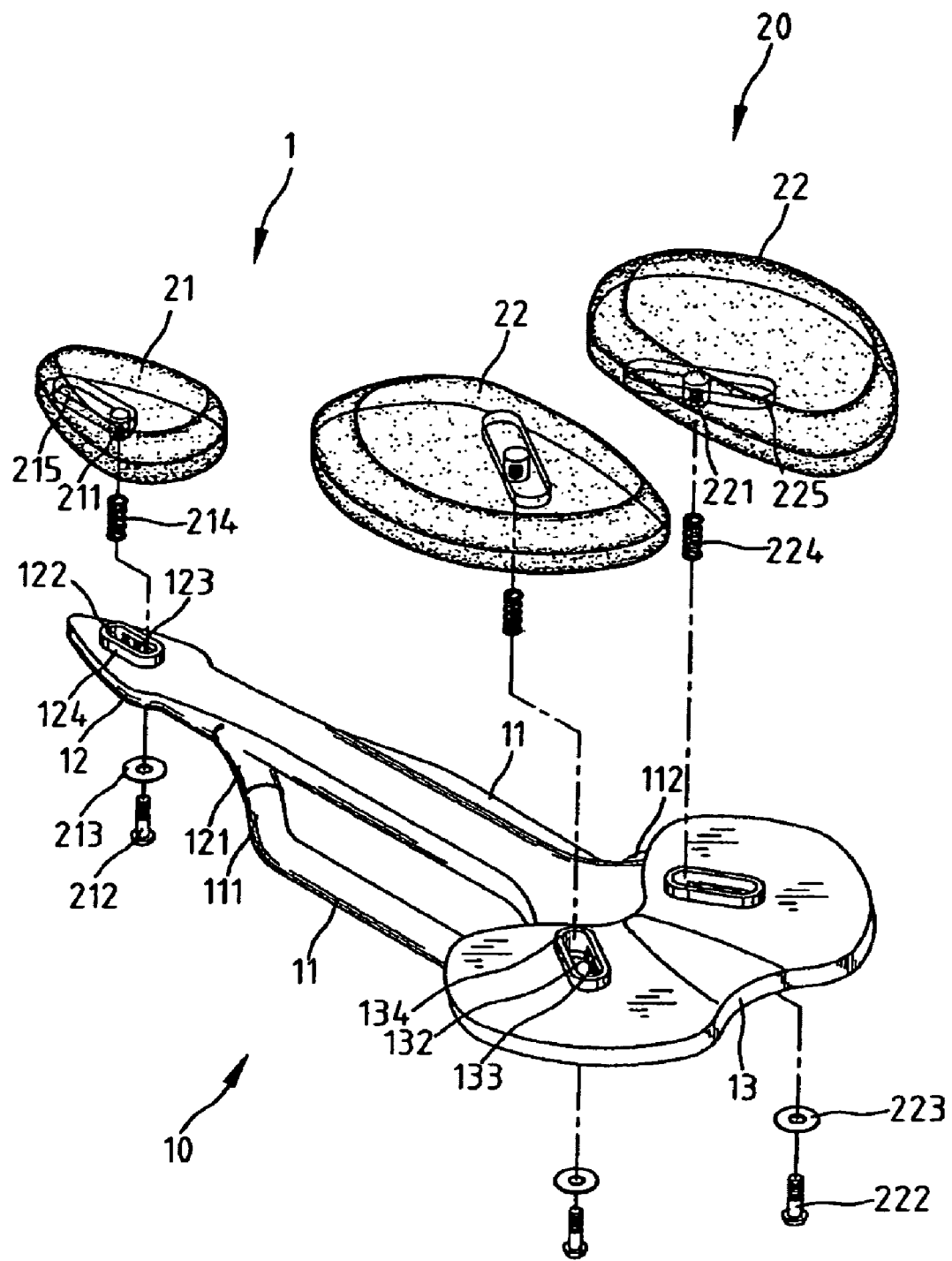
FIG. 2 is an exploded view of the saddle shown in FIG. 1.
Figure 3:
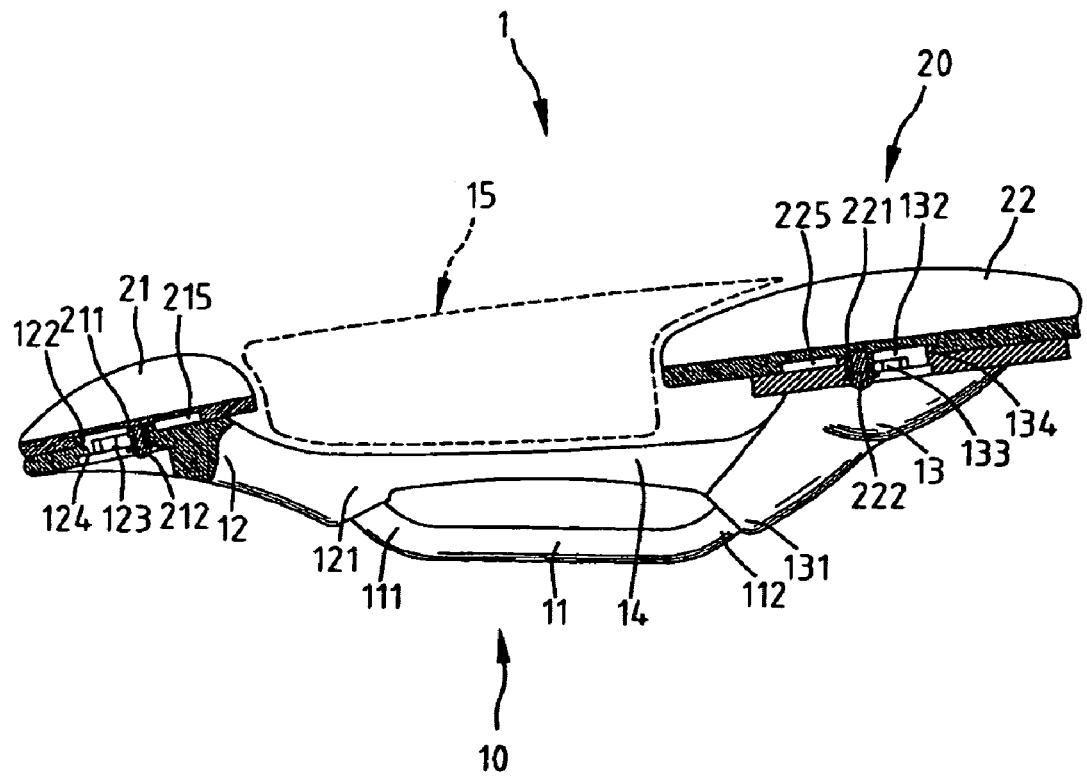
FIG. 3 is a cross-sectional view of the saddle shown in FIG. 1.

Referring to FIGS. 2 and 3, the frame 10 includes a strip 14, a front tray 12 formed at a front section of the strip 14, a rear tray 13 formed at a rear section of the strip 14 and two beams 11 for connecting the front tray 12 to the rear tray 13. In the preferred form shown, the two beams 11 extend in a spaced relation between the front tray 12 and the rear tray 13 with the strip 14 spaced from and intermediate the two beams 11. The strip 14 is used to reinforce the frame 10. The strip 14 can however be omitted in another embodiment.

Each of the beams 11 includes a front section 111 extending forward and upward and a rear section 112 extending backward and upward. The front sections 111 of the beams 11 extend toward each other. The rear sections 112 of the beams 11 extend away from each other. The beams 11 can be connected to the saddle post of a bicycle.

The front tray 12 includes two sockets 121 for receiving the front sections 111 of the beams 11. The front tray 12 defines a slot 122. A plurality of restraints 123 is formed on the wall of the slot 122. The restraints 123 divide the slot 122 into several sections. A wall 124 is formed on the front tray 12 around the slot 122.

The rear tray 13 includes two sockets 131 for receiving the rear sections 112 of the beams 11. The rear tray 13 defines two slots 132 that extend away from each other while extending backward. Some restraints 133 are formed on the wall of each of the slots 132 in order to divide the slot 132 into several sections. The rear tray 13 includes two walls 134 each around related one of the slots 132.

The padding device 20 includes a front pad 21 and two rear pads 22. The front pad 21 includes a groove 215 defined in the bottom and a block 211 formed on the bottom within the groove 215.

The front pad 21 is positioned on the front tray 12. The block 211 is positioned in the slot 122 and, more particularly, in selected one of the sections of the slot 122. The groove 215 receives the wall 124 so that the front pad 21 can slide but cannot rotate on the front tray 12. A fastener 212 is driven into the block 211 through a washer 213 in order to keep the front pad 21 on the front tray 12. The fastener 212 may be a threaded bolt, and the block 211 may accordingly be a nut. A helical spring 214 is provided around the fastener 212 and compressed between the block 211 and the washer 213.

Each of the rear pads 22 includes a groove 225 defined in the bottom and a block 221 formed on the bottom within the groove 225.

The rear pads 22 are positioned on the rear tray 13. The block 221 of each of the rear pads 22 is positioned in related one of the slots 132 and, more particularly, in selected one of the sections of the related slot 132. The grooves 225 receive the walls 134 so that the rear pads 22 can slide but cannot rotate on the rear tray 13. A fastener 222 is driven into each of the blocks 221 through a washer 223 in order to keep each of the rear pads 22 on the rear tray 13. The fasteners 222 may be threaded bolts, and the blocks 221 may accordingly be nuts. A helical spring 224 may be provided around each of the fasteners 222 and compressed between related one of the blocks 221 and related one of the washers 223.

As clearly shown in FIG. 3, there is a space 15 above a horizontal portion of the strip 14 and between the front pad 21 and the rear pads 22. Due to the horizontal portion being lower than the front pad 21 and the rear pads 22, this space 15 can accommodate a male rider's scrotum.

Figure 4:
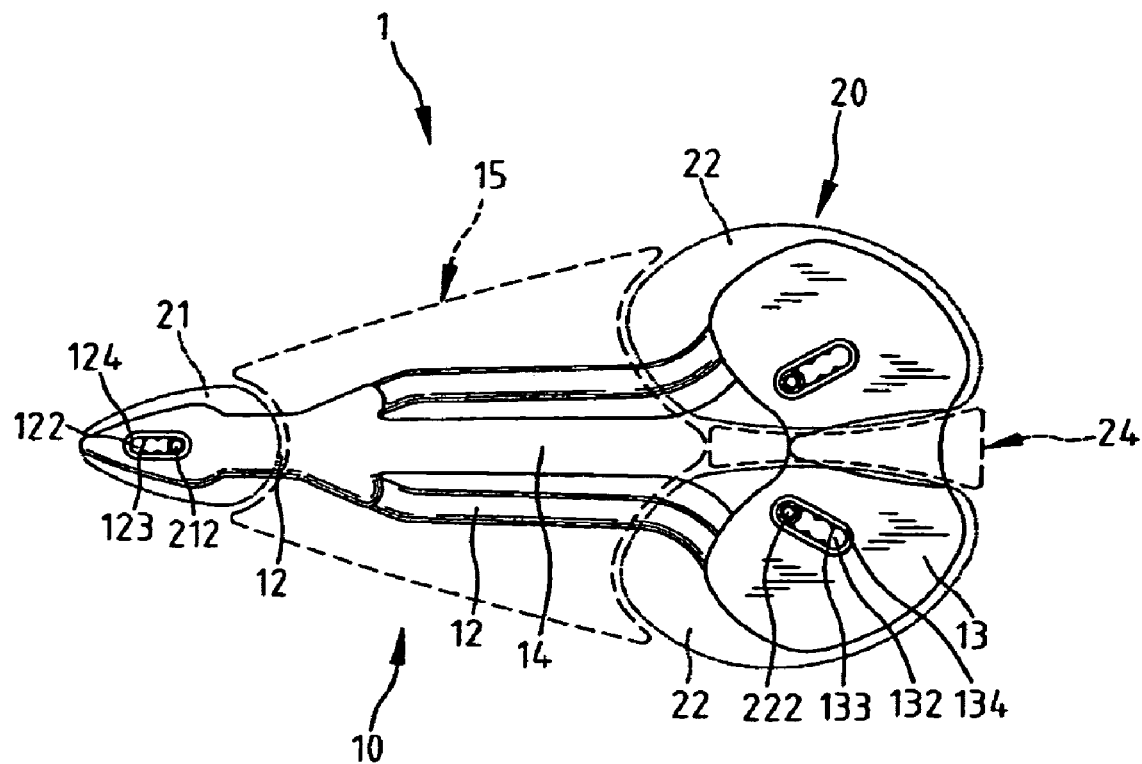
FIG. 4 is a top view of the saddle shown in FIG. 1.

Referring to FIG. 4, there is a space 24 between the rear pads 22. With the space 24 between the rear pads 22, a rider's perineum will not be pressed against the saddle 1.

Figure 5:
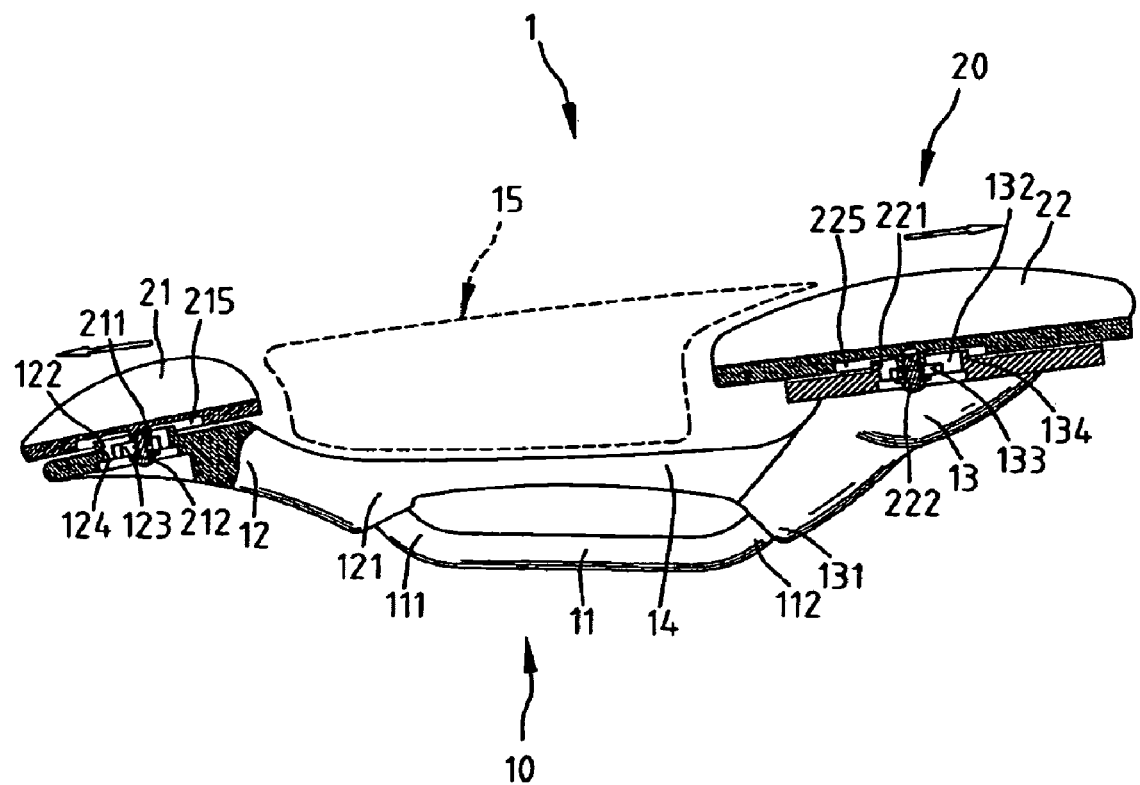
FIG. 5 is a cross-sectional view of the saddle in another position than shown in FIG. 3.

Referring to FIG. 5, to adjust the size of the saddle 1, i.e., to change the position of the front pad 21 or each rear pad 22, the fastener 212 or 222 is slackened. The front pad 21 or each rear pad 22 is lifted in order to move the block 211 or 221 from the slot 122 or 132. The block 211 or 221 is free from the restraints 123 or 133. The fastener 212 or 222 is free to move from one to another of the sections of the slot 122 or 132. The front pad 21 or each rear pad 22 can be moved.

Figure 6:
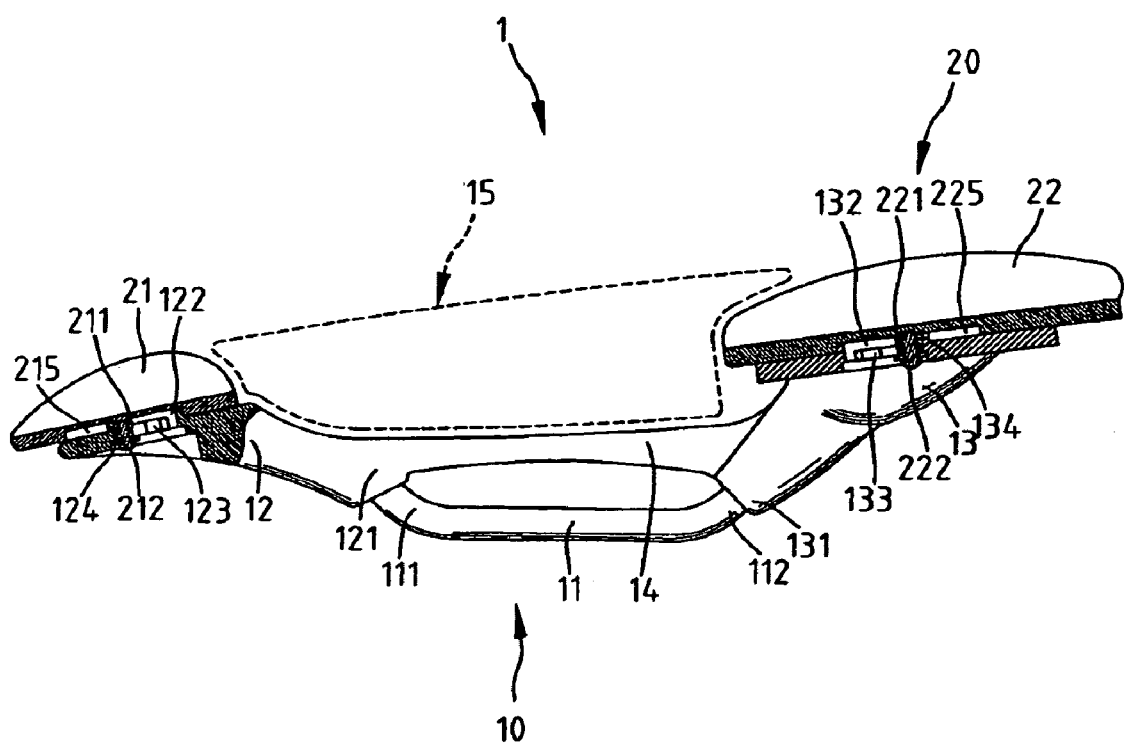
FIG. 6 is a cross-sectional view of the saddle in another position than shown in FIG. 5.
Figure 7:
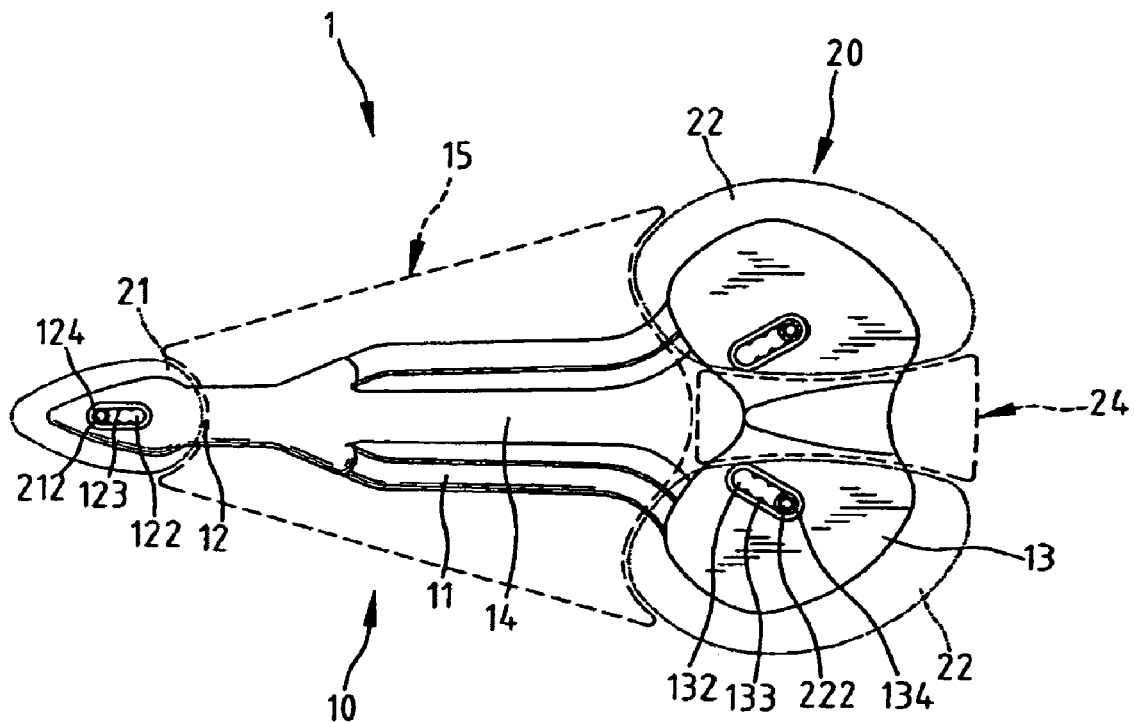
FIG. 7 is a top view of the saddle shown in FIG. 6.

Referring to FIGS. 6 and 7, after the size of the saddle 1 is adjusted to a desired value, the front pad 21 or each rear pad 22 is lowered in order to move the block 211 or 221 into selected one of the sections of the slot 122 or 132. The fastener 212 or 222 is tightened. The front pad 21 or each rear pad 22 is positioned.

The saddle 1 of the present invention exhibits several advantages. Firstly, its size can be adjusted in order to fit different riders. Secondly, the slots 132 extend away from each other while extending backward so that the rear pads 22 move away from each other while moving backward, i.e., the saddle 1 grows wider while growing longer. Thirdly, the saddle 1 provides the spaces 15 and 24 for riders so that their circulation of blood will not be depressed.

Figure 8:
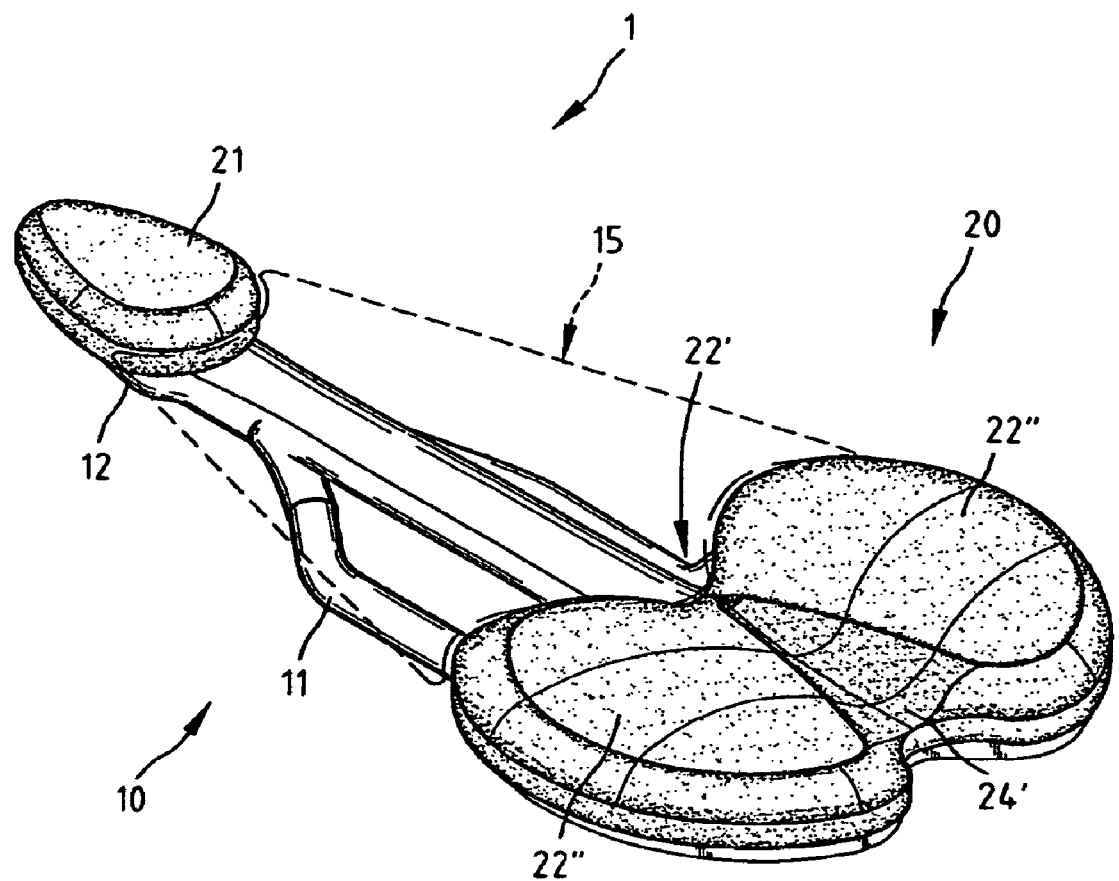
FIG. 8 is a perspective view of a saddle of a bicycle according to the second embodiment of the present invention.
Figure 9:
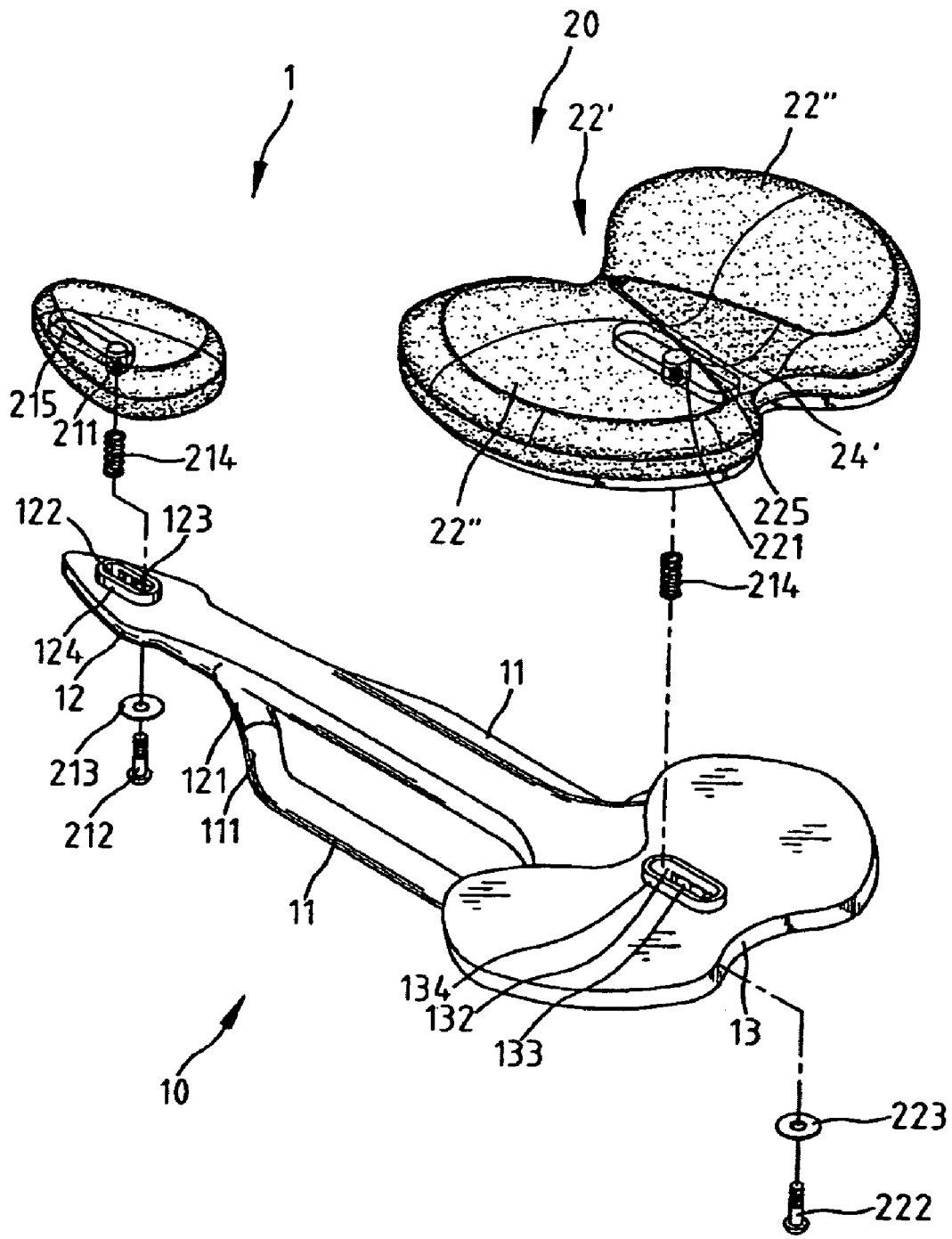
FIG. 9 is an exploded view of the saddle shown in FIG. 8.
Figure 10:
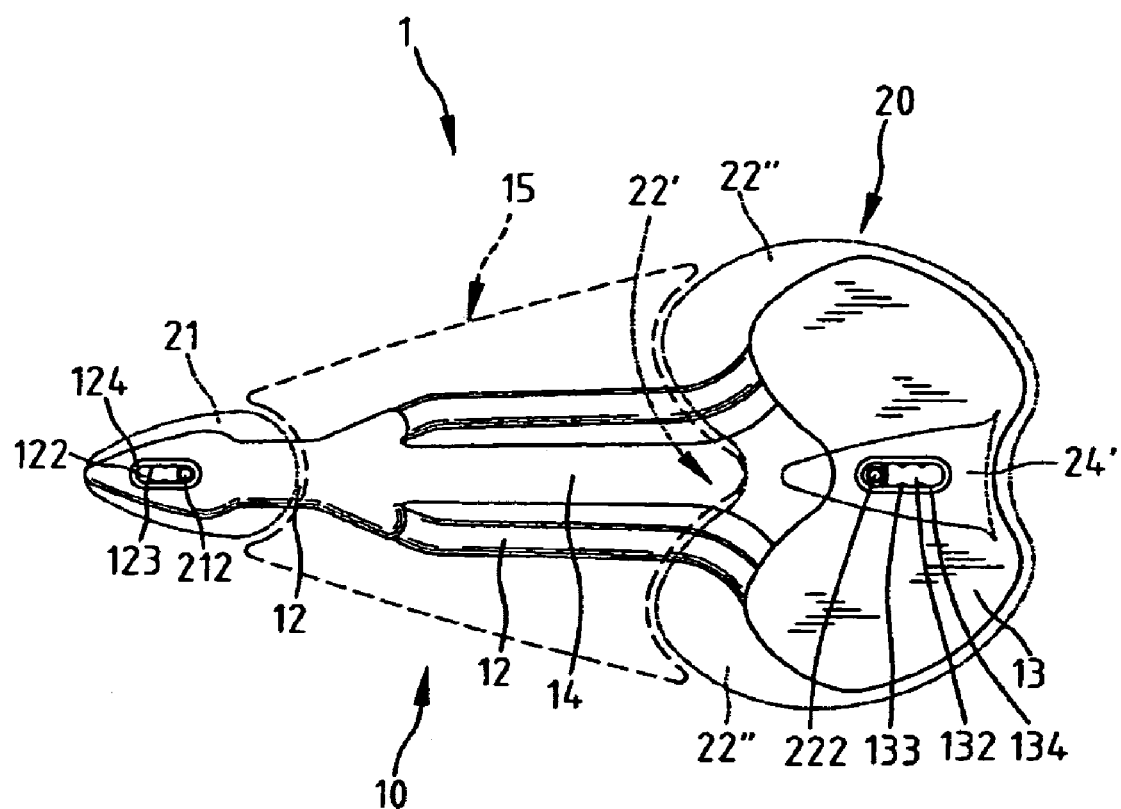
FIG. 10 is a top view of the saddle shown in FIG. 8.
Figure 11:
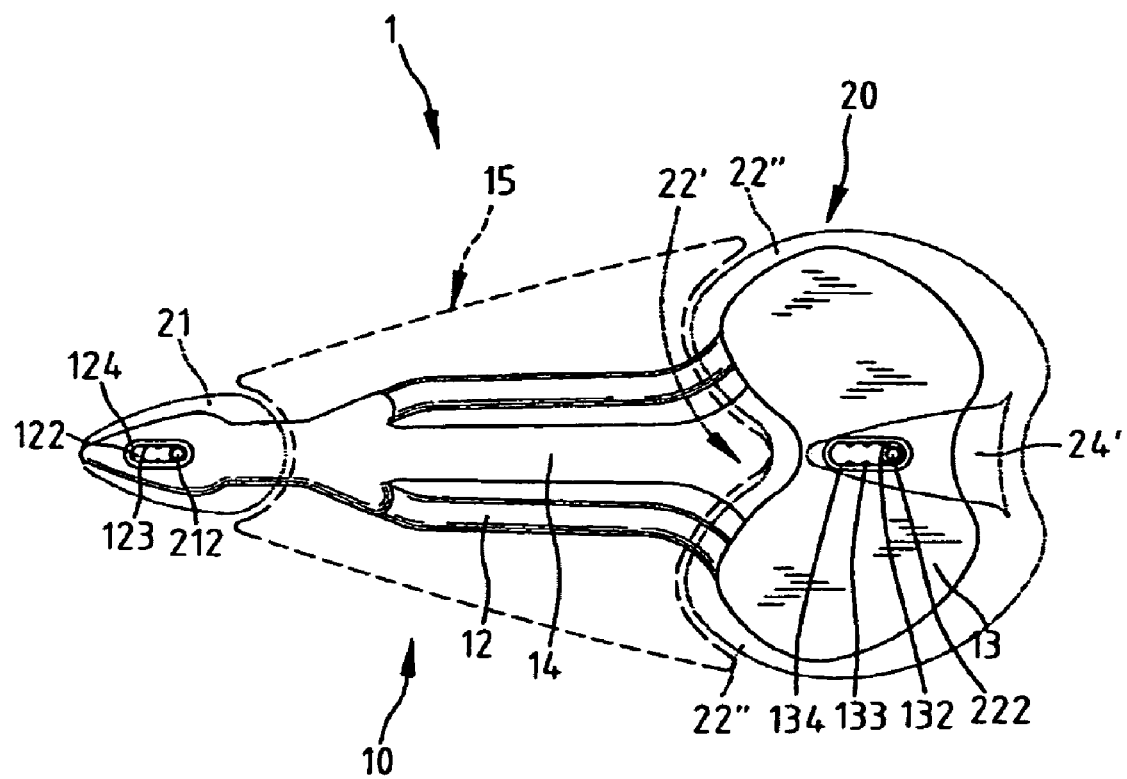
FIG. 11 shows the saddle in another position than shown in FIG. 10.

Referring to FIGS. 8 though 11, there is shown a saddle 1 according to a second embodiment of the present invention. The second embodiment is like the first embodiment except including only one rear pad 22' instead of the rear pads 22. The rear pad 22' includes two padding portions 22'' like the rear pads 22 and a recess 24' between the padding portions 22''. The rear pad 22' includes a block 221 and defines a groove 225. Accordingly, the rear tray 13 defines only one slot 132 for receiving the block 221. A plurality of restraints 133 is formed on the wall of the slot 132. The groove 225 movably receives a wall 134 extending around the slot 132. Thus, the rear pad 22' is movable on the rear tray 13.

The present invention has been described through the illustration of the embodiments. Those skilled in the art can derive variations from the embodiments without departing from the scope of the present invention. Therefore, the embodiments shall not limit the scope of the present invention defined in the claims.

What is claimed is:

1. A saddle comprising:
   a frame comprising a front tray and a rear tray defining at least one slot; and
   a padding device comprising a front pad installed on the front tray and at least one rear pad comprising a block formed on the bottom, wherein the block is movable in the slot so that the rear pad is movable on the rear tray;
   wherein the rear tray comprises a wall around the slot, wherein the rear pad defines a groove for receiving the wall so that the rear pad can move but cannot rotate on the rear tray.

2. The saddle according to claim 1 wherein the rear tray comprises a number of restraints on the wall of the slot in order to divide the slot into a plurality of sections for receiving the block of the rear pad.

3. The saddle according to claim 2 comprising a fastener driven into the block of the rear pad so as to keep the rear pad on the rear tray.

4. The saddle according to claim 3 wherein the fastener is a threaded bolt, wherein the block is a nut.

5. The saddle according to claim 1 wherein the rear pad comprises two padding portions and a recess between the padding portions.

6. A saddle comprising:
   a frame comprising a front tray and a rear tray defining at least one slot; and
   a padding device comprising a front pad installed on the front tray and at least one rear pad comprising a block formed on the bottom, wherein the block is movable in the slot so that the rear pad is movable on the rear tray;
   wherein the front tray defines a slot, wherein the front pad comprises a block formed on the bottom thereof, wherein the block of the front pad is movable in the slot of the front tray so that the front pad is movable on the front tray;
   wherein the front tray comprises a wall around the slot thereof wherein the front pad comprises a groove for receiving the wall of the front tray so that the front pad can move but cannot rotate on the front tray.

7. The saddle according to claim 6 wherein the front tray comprises a number of restraints on the wall of the slot thereof in order to divide the slot thereof into a plurality of sections for receiving the block of the front pad.

8. The saddle according to claim 7 comprising a fastener driven into the block of the front pad in order to keep the front pad on the front tray.

9. The saddle according to claim 8 wherein the fastener is a threaded bolt, wherein the block is a nut.

10. The saddle according to claim 6 wherein the slot of the front tray extends in a longitudinal direction of the saddle.

11. A saddle comprising:
    a frame comprising a front tray and a rear tray defining two slots; and
    a padding device comprising a front pad installed on the front tray and two rear pads each comprising a block formed on the bottom and movable in one of the two slots so that the rear pad is movable on the rear tray;
    wherein the frame comprises first and second beams connecting the front tray to the rear tray and extending in a spaced relation between the front tray and the rear tray, wherein the frame further comprises a strip formed between the front tray and the rear tray and spaced from and intermediate the first and second beams;
    wherein the rear tray comprises a wall around each of the two slots, wherein each of the two rear pads comprises a groove for receiving a related one of the walls so that the two rear pads can move but cannot rotate on the rear tray;
    wherein a horizontal portion of the strip is lower than the front and rear trays, with a space provided above the horizontal portion of the strip and between the front pad and the two rear pads for accommodating a male rider's scrotum.

12. The saddle according to claim 11 wherein each of the first and second beams comprises a front section, wherein the front tray comprises two sockets for receiving the front sections of the first and second beams.

13. The saddle according to claim 12 wherein the front sections of the first and second beams extend toward each other while extending forward.

14. The saddle according to claim 11 wherein each of the first and second beams comprises a rear section, wherein the rear tray comprises two sockets for receiving the rear sections of the first and second beams.

15. The saddle according to claim 14 wherein the rear sections of the first and second beams extend away from each other while extending backward.

16. The saddle according to claim 11 wherein the rear tray comprises a number of restraints on the wall around each of the two slots in order to divide the related slot into a plurality of sections for receiving the block of the related one of the two rear pads.

17. The saddle according to claim 16 comprising a fastener driven into the block of each of the two rear pads in order to keep the rear pad on the rear tray.

18. The saddle according to claim 17 wherein the fastener is a threaded bolt, wherein the block is a nut.

19. The saddle according to claim 11 wherein the two slots extend from each other while extending backward.

* * * * *